United States Patent
McArdle

(10) Patent No.: US 9,462,225 B2
(45) Date of Patent: Oct. 4, 2016

(54) PRESENTATION SYSTEMS AND RELATED METHODS

(71) Applicant: Zeller Digital Innovations, Inc., Normal, IL (US)

(72) Inventor: Justin McArdle, Heyworth, IL (US)

(73) Assignee: ZELLER DIGITAL INNOVATIONS, INC., Normal, IL (US)

( * ) Notice: Subject to any disclaimer, the term of this patent is extended or adjusted under 35 U.S.C. 154(b) by 173 days.

(21) Appl. No.: 14/216,183

(22) Filed: Mar. 17, 2014

(65) Prior Publication Data

US 2014/0285615 A1 Sep. 25, 2014

Related U.S. Application Data

(60) Provisional application No. 61/794,805, filed on Mar. 15, 2013.

(51) Int. Cl.
*H04N 7/14* (2006.01)
*H04N 7/15* (2006.01)

(52) U.S. Cl.
CPC ...................... *H04N 7/15* (2013.01)

(58) Field of Classification Search
USPC ............... 348/14.01–14.16; 370/259–271, 370/351–357; 379/201.01, 202.01–207.01; 709/201–207, 217–248
See application file for complete search history.

(56) References Cited

U.S. PATENT DOCUMENTS

| | | | |
|---|---|---|---|
| 5,526,037 A | 6/1996 | Cortjens et al. | |
| 7,734,831 B2 * | 6/2010 | Ip et al. | 710/5 |
| 8,130,256 B2 | 3/2012 | Trachtenberg et al. | |
| 8,134,588 B2 * | 3/2012 | Tucker | 348/14.13 |
| 8,208,534 B2 * | 6/2012 | Kreiner et al. | 375/240.01 |
| 8,237,765 B2 | 8/2012 | King et al. | |
| 8,284,230 B2 * | 10/2012 | Jeong | G01S 3/7864 348/14.01 |
| 8,358,327 B2 * | 1/2013 | Duddy et al. | 348/14.03 |
| 8,548,417 B2 * | 10/2013 | Tucker et al. | 455/344 |
| 8,593,502 B2 * | 11/2013 | Saleh et al. | 348/14.03 |
| 8,619,953 B2 * | 12/2013 | Nietfeld et al. | 379/93.21 |
| 8,670,018 B2 * | 3/2014 | Cunnington et al. | 348/14.08 |
| 2003/0103075 A1 * | 6/2003 | Rosselot | 345/717 |
| 2006/0132595 A1 | 6/2006 | Kenoyer et al. | |
| 2010/0226487 A1 * | 9/2010 | Harder et al. | 379/202.01 |

* cited by examiner

*Primary Examiner* — Hemant Patel
(74) *Attorney, Agent, or Firm* — Harness, Dickey & Pierce, P.L.C.

(57) ABSTRACT

A videoconferencing system includes a codec configured to generate one or more acknowledgement signals, a remote control for controlling the codec, a system controller in communication with the codec, and at least one other videoconferencing component. The system controller is configured to send one or more commands to the other videoconferencing component in response to the one or more acknowledgement signals generated by the codec. Other videoconferencing systems and presentation systems and related methods are also disclosed.

21 Claims, 15 Drawing Sheets

PRESENTATION SYSTEMS AND RELATED METHODS

CROSS-REFERENCE TO RELATED APPLICATION

This application claims the benefit of U.S. Provisional Patent Application No. 61/794,805 filed Mar. 15, 2013. The entire disclosure of the above application is incorporated herein by reference.

FIELD

The present disclosure relates to presentation systems, including videoconferencing systems, and related methods.

BACKGROUND

This section provides background information related to the present disclosure which is not necessarily prior art.

FIG. 1 illustrates a typical videoconferencing system according to the prior art. As shown therein, the system includes a codec 24 having a (wired or wireless) remote control 28 with a user interface 32, such as a touch screen user interface. A user of the system can initiate video calls, end or "hang up" video calls, adjust the volume of a call, etc. via the remote control 28 for the codec 24. However, other devices (including, e.g., a flat panel display 30, window shade control 32, lighting control 36, etc.) cannot be controlled via the codec remote 28, and must instead be controlled separately, typically using additional remote controls and/or user interfaces on the devices themselves. For example, in the system of FIG. 1, a user must power on the flat panel display 30 by pressing the power button on the flat panel display 30 or its remote control.

FIG. 2 illustrates another videoconferencing system according to the prior art. The system of FIG. 2 is similar to the system of FIG. 1, but further includes a programmable remote 64 (also referred to as a "custom remote") having a user interface 68, such as a touch screen user interface. The custom remote 64 is typically programmed for controlling (wirelessly and/or via cables) not only the codec 24, but other devices as well, such as the flat panel display 30, window shade control 32, lighting control 36, etc., either directly or via a control processor 65 (also referred to as a remote processor). Therefore, a user may control the entire system of FIG. 2 via the custom remote 64. In that case, the other remote controls shown in FIG. 1 are not included in the system of FIG. 2 and, to the extent they are provided, can be stored away.

FIGS. 3A-3D illustrate another videoconferencing system according to the prior art. The system of FIGS. 3A-3D includes a custom user interface 68 which is typically programmed using a proprietary programming language to "talk" directly to, and only to, a system controller 65 (via wires and/or wirelessly) for controlling the various devices in the system. Feedback from the various devices connected to the system controller 65 is provided by the system controller 65 to the custom user interface 68. The controller 65 is programmed to control each device in the system and report the state of each device back to the custom user interface 68.

SUMMARY

This section provides a general summary of the disclosure, and is not a comprehensive disclosure of its full scope or all of its features.

According to one aspect of the present disclosure, a videoconferencing system includes a codec configured to generate one or more acknowledgement signals, a remote control for controlling the codec, a system controller in communication with the codec, and at least one other videoconferencing component. The system controller is configured to send one or more commands to the other videoconferencing component in response to the one or more acknowledgement signals generated by the codec.

According to another aspect of the present disclosure, a method for a user to control a videoconferencing system is disclosed. The method includes controlling the system using only a remote control configured for controlling a codec. The remote control may be configured for controlling only the codec.

According to yet another aspect of the present disclosure, a presentation system includes a presentation switch having an input for connecting a presentation source, a system controller in communication with the presentation switch, and at least one other presentation component. The presentation switch is configured to generate one or more acknowledgement signals. The system controller is configured to send one or more commands to the other presentation component or the presentation switch in response to receiving the one or more acknowledgement signals generated by the presentation switch.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
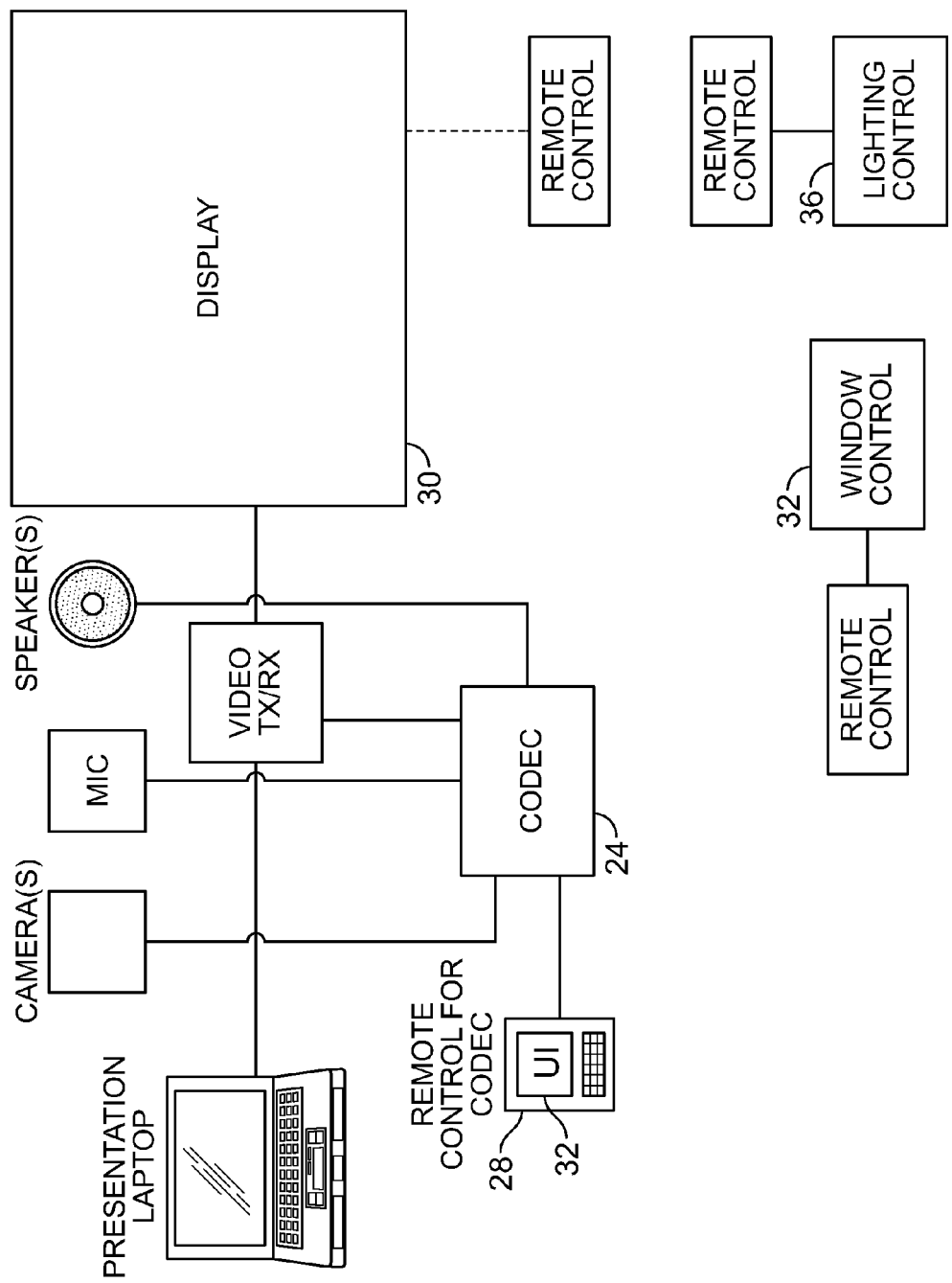
FIG. 1 is a block diagram of a videoconferencing system according to the prior art.
Figure 2:
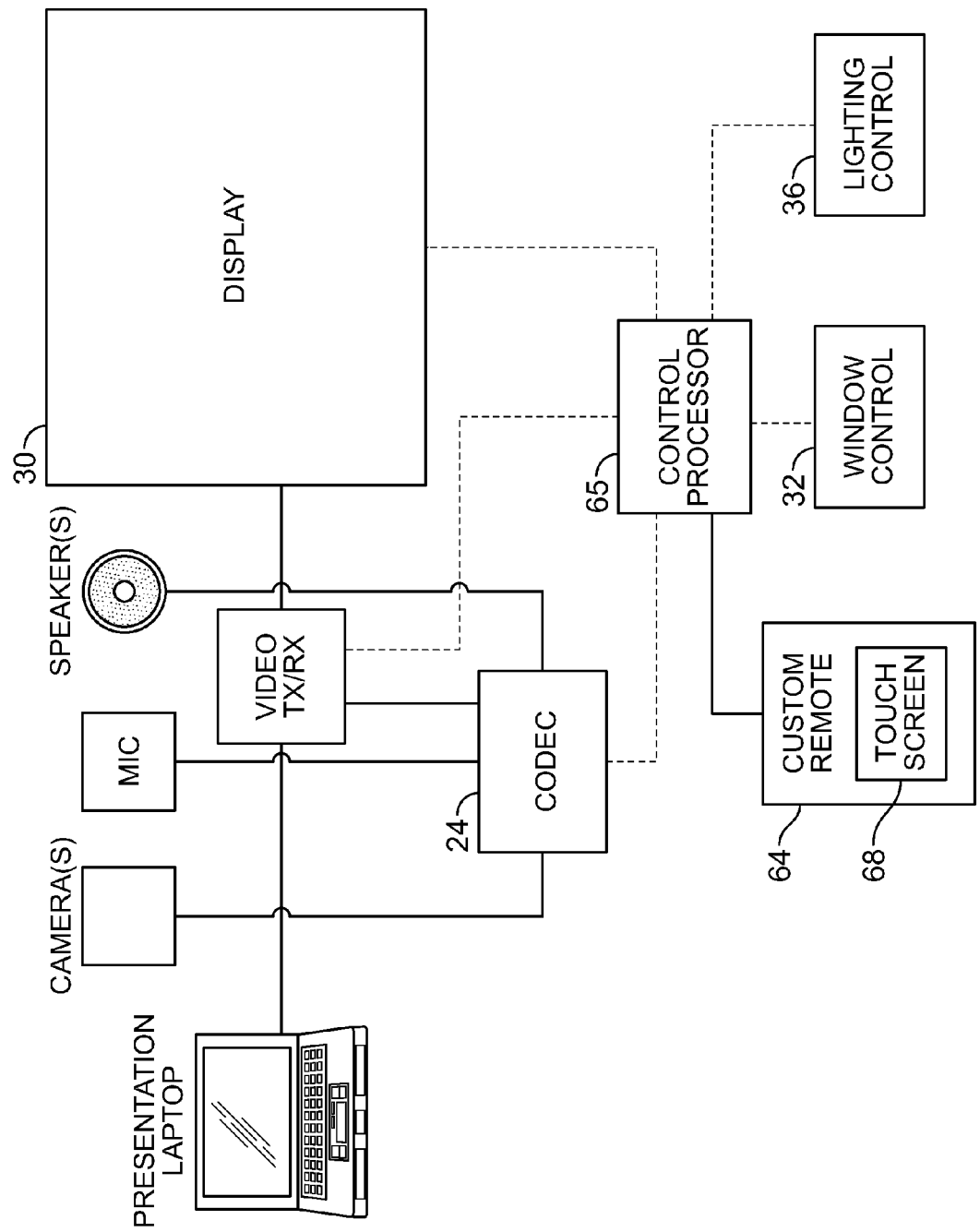
FIG. 2 is a block diagram of a videoconferencing system having a custom remote control according to the prior art.
Figure 3A:
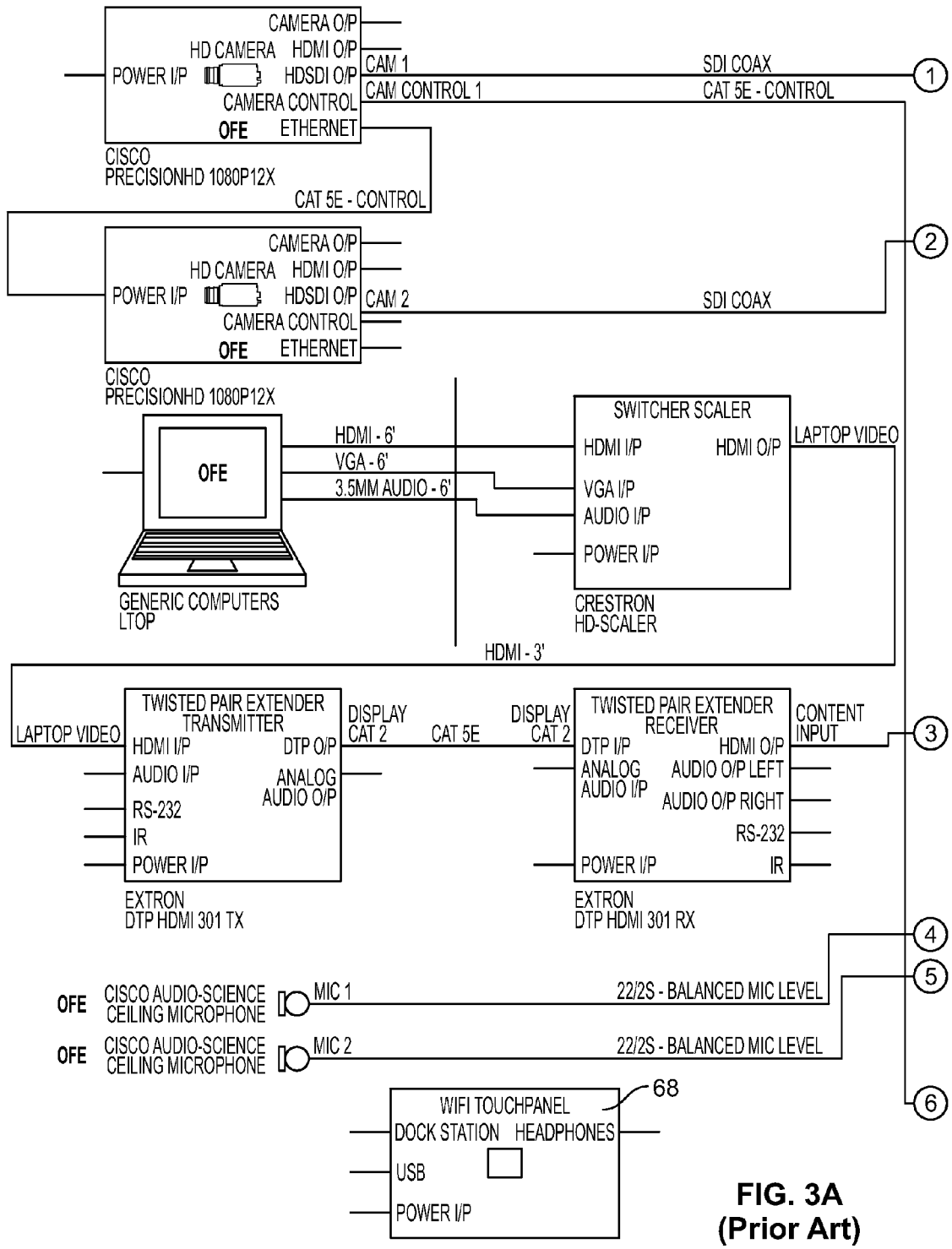
FIGS. 3A-3D are a wiring diagram of another videoconferencing system having a custom user interface according to the prior art.
Figure 3B:
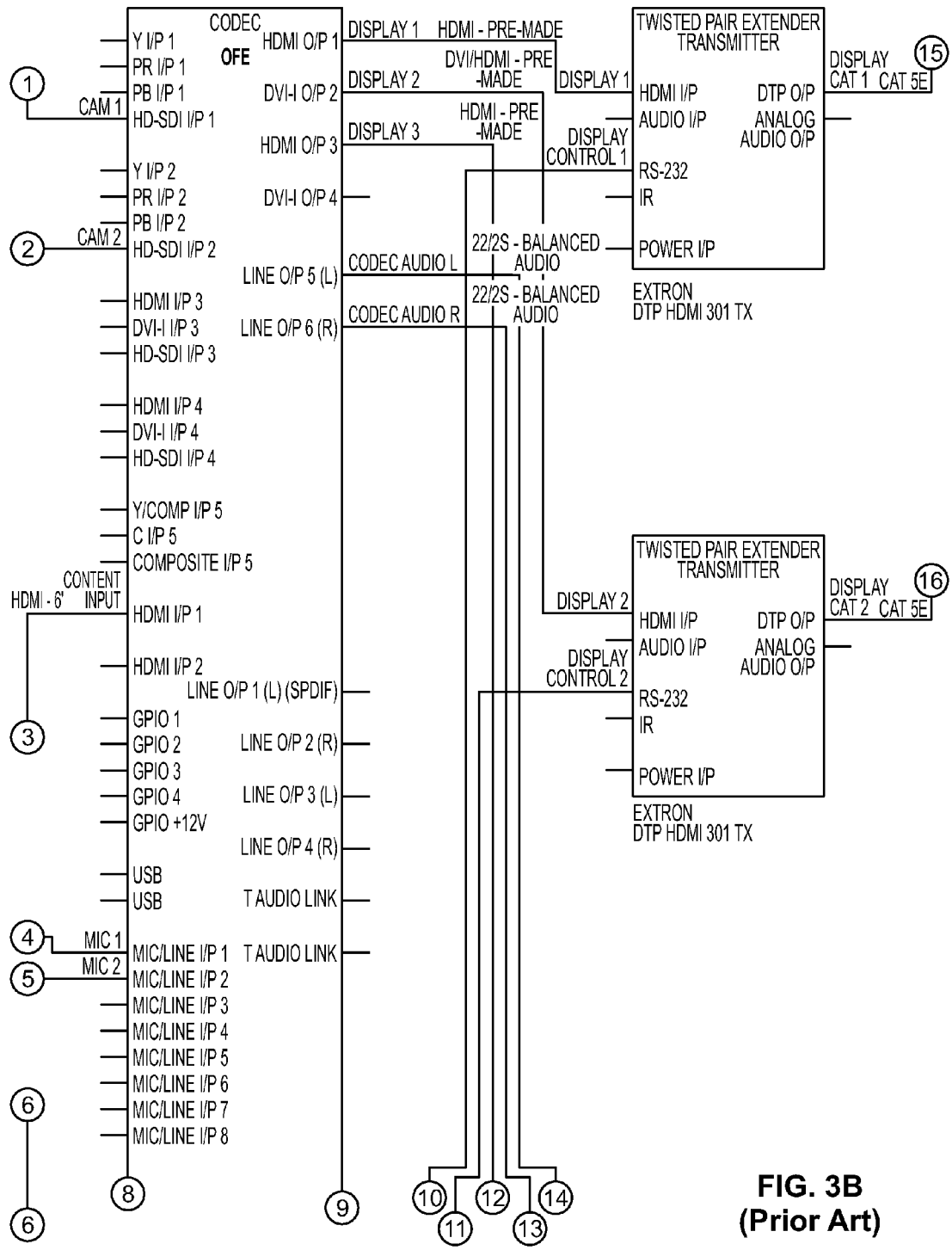
Figure 3B:
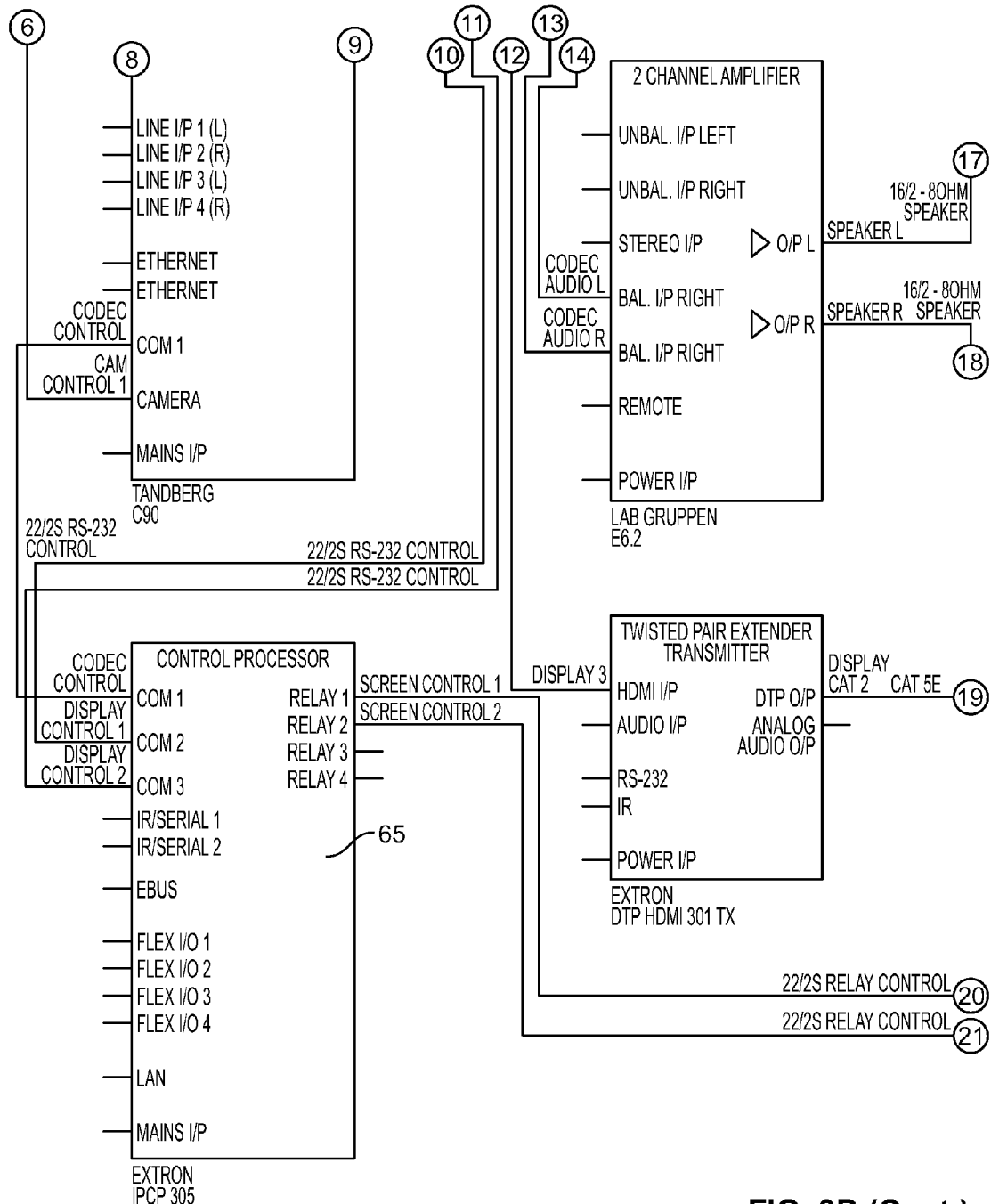
Figure 3C:
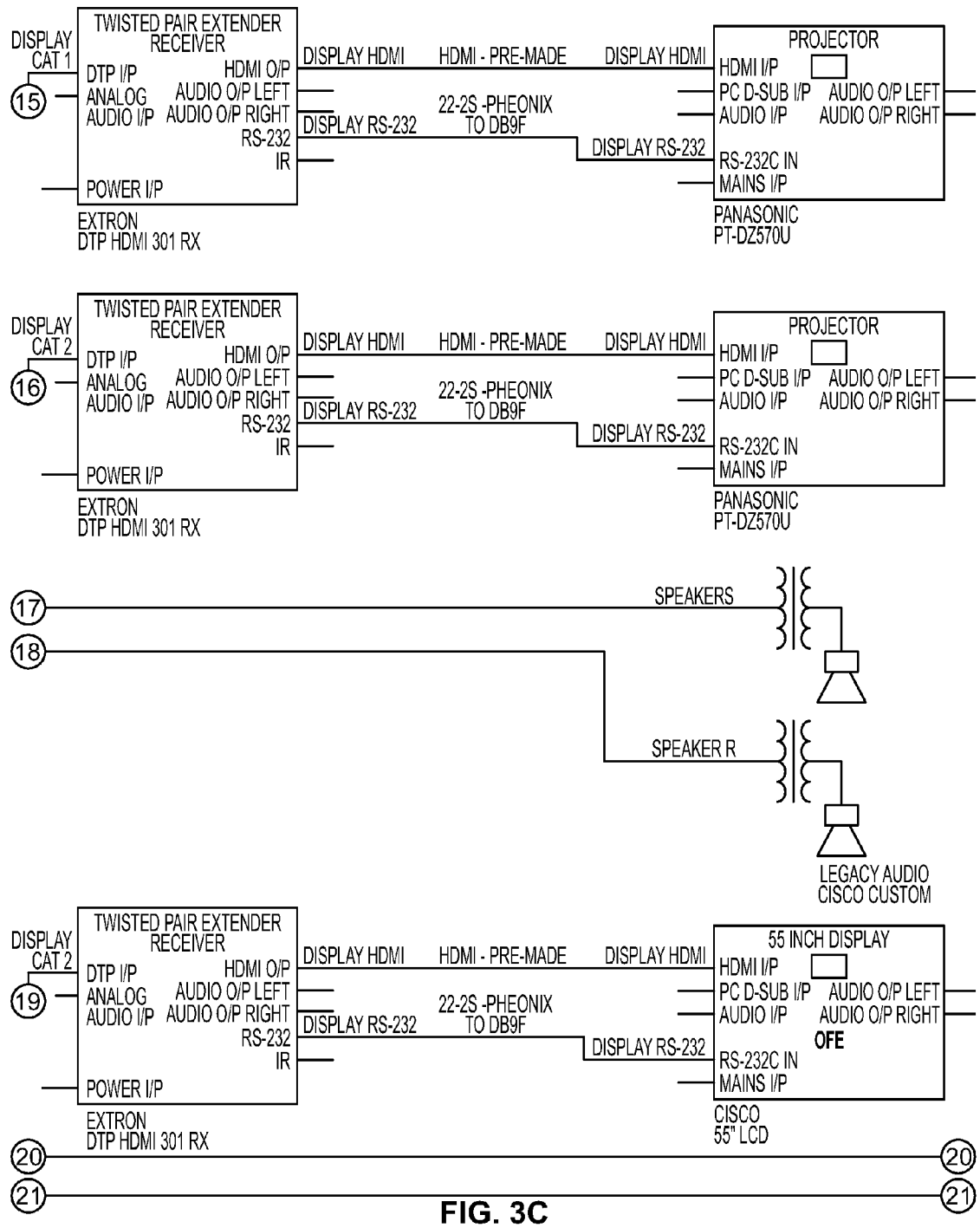
Figure 3D:
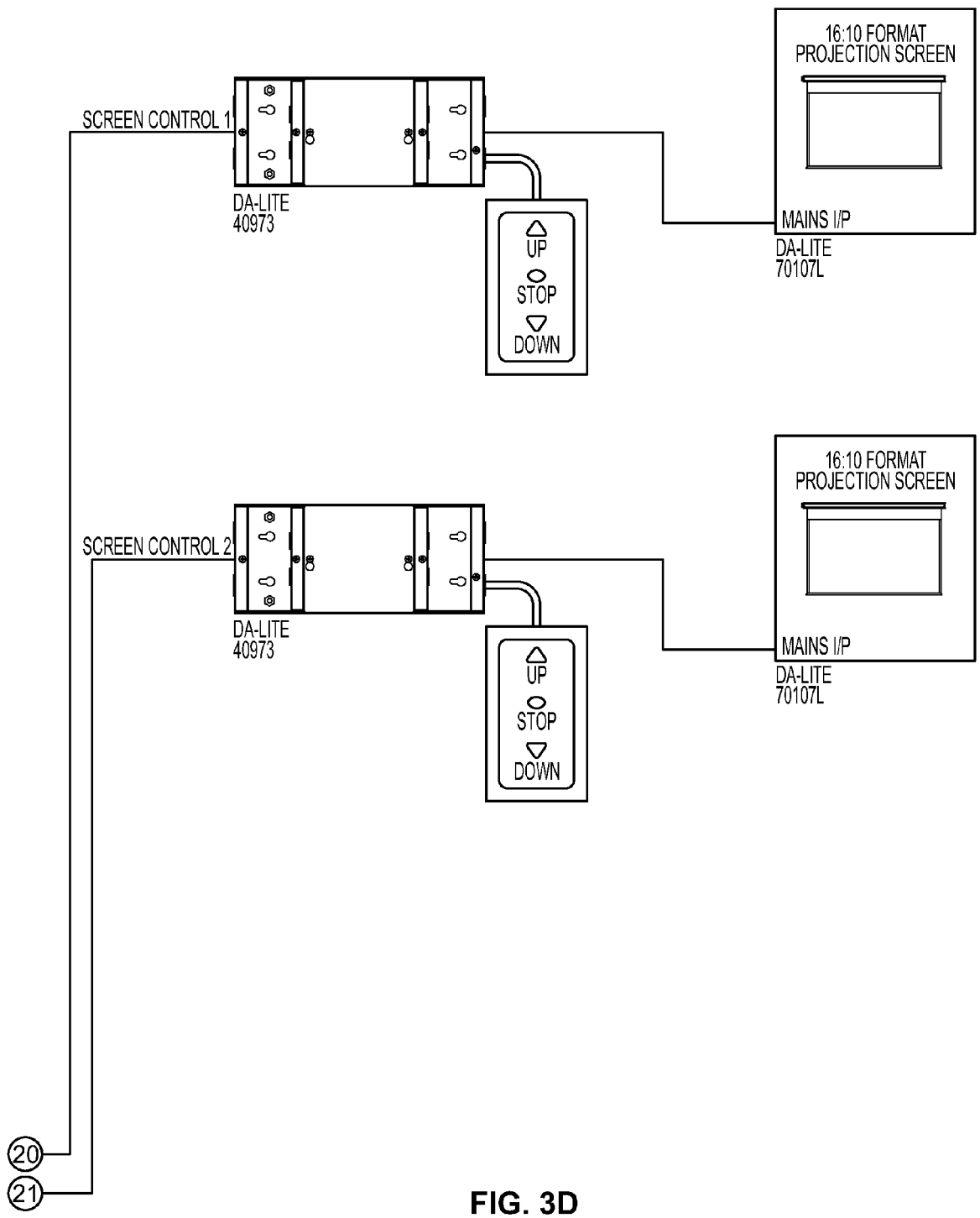

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As used herein, the term "and/or" includes any and all combinations of one or more of the associated listed items. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 4:
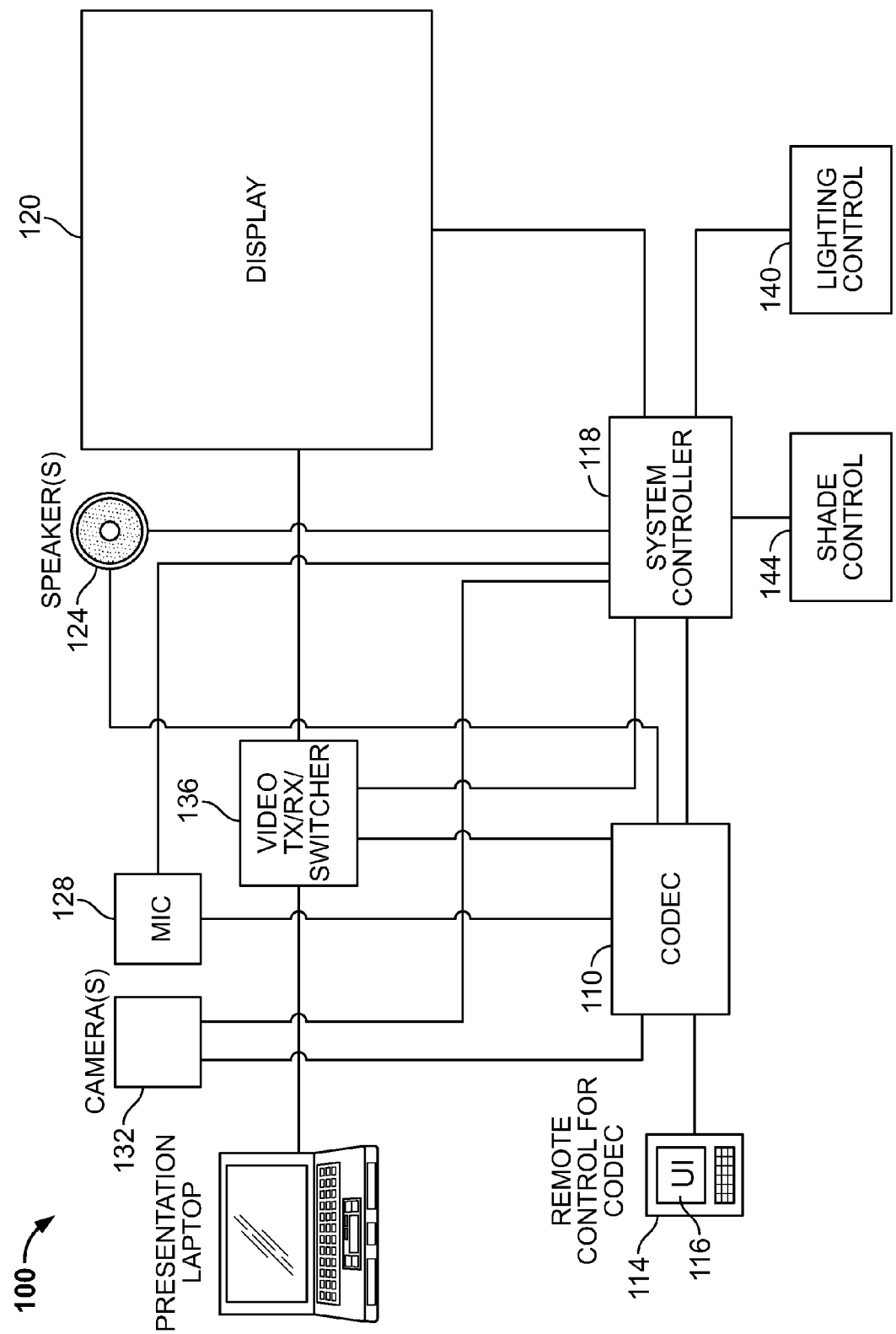
FIG. 4 is a block diagram of a videoconferencing system according to one example embodiment of the present disclosure.
Figure 5A:
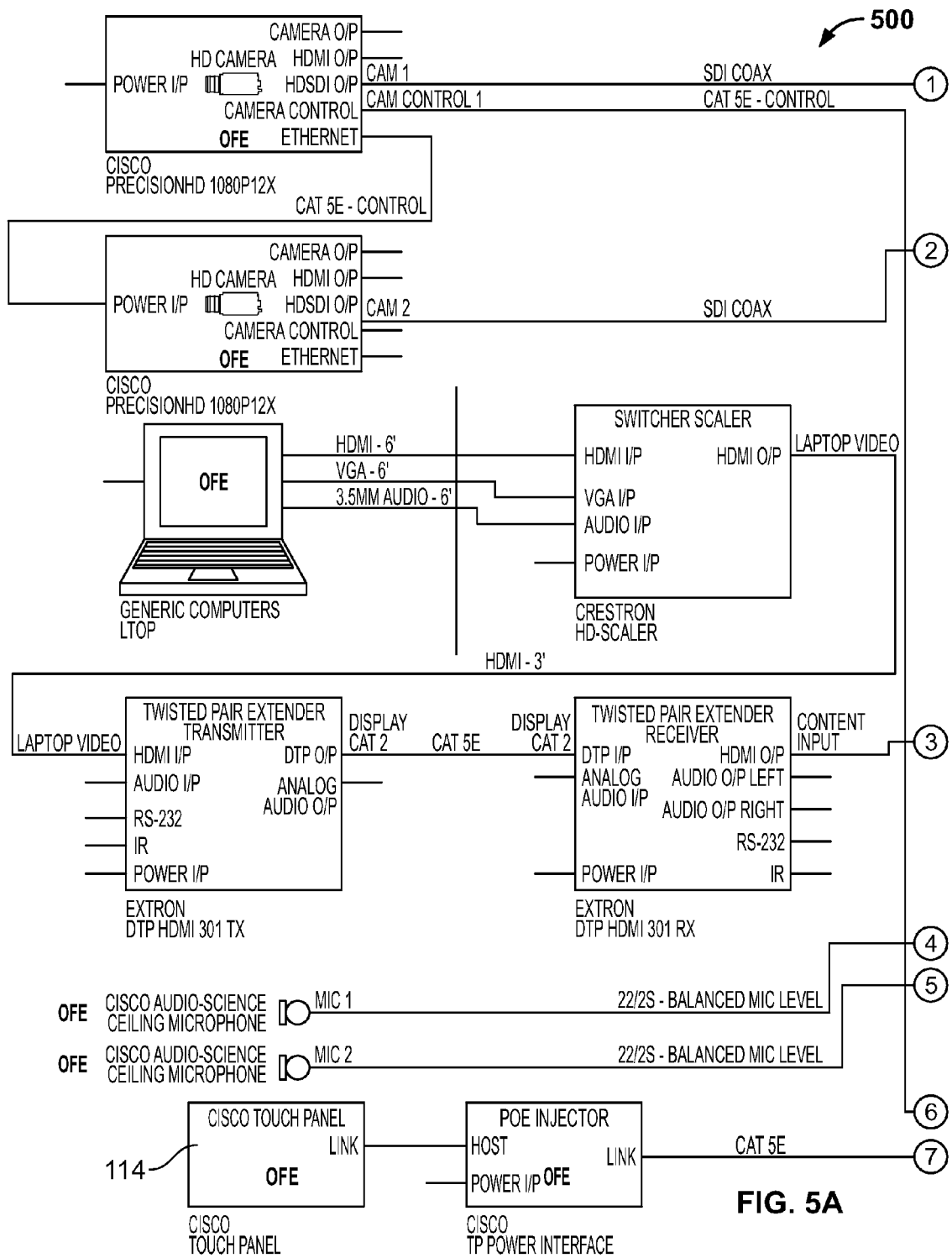
FIGS. 5A-5D are a wiring diagram of a videoconferencing system according to another example embodiment of the present disclosure.
Figure 5B:
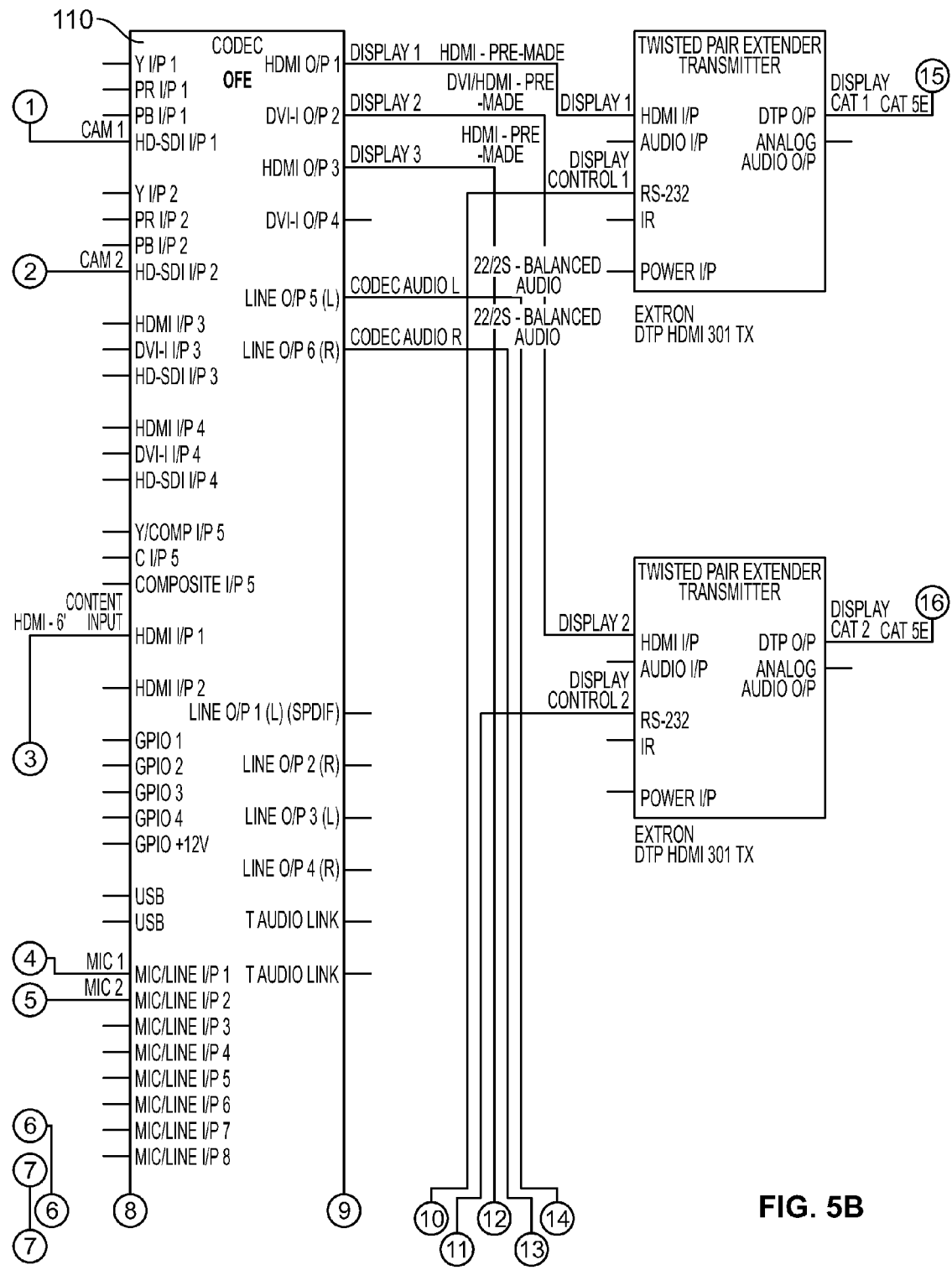
Figure 5B:
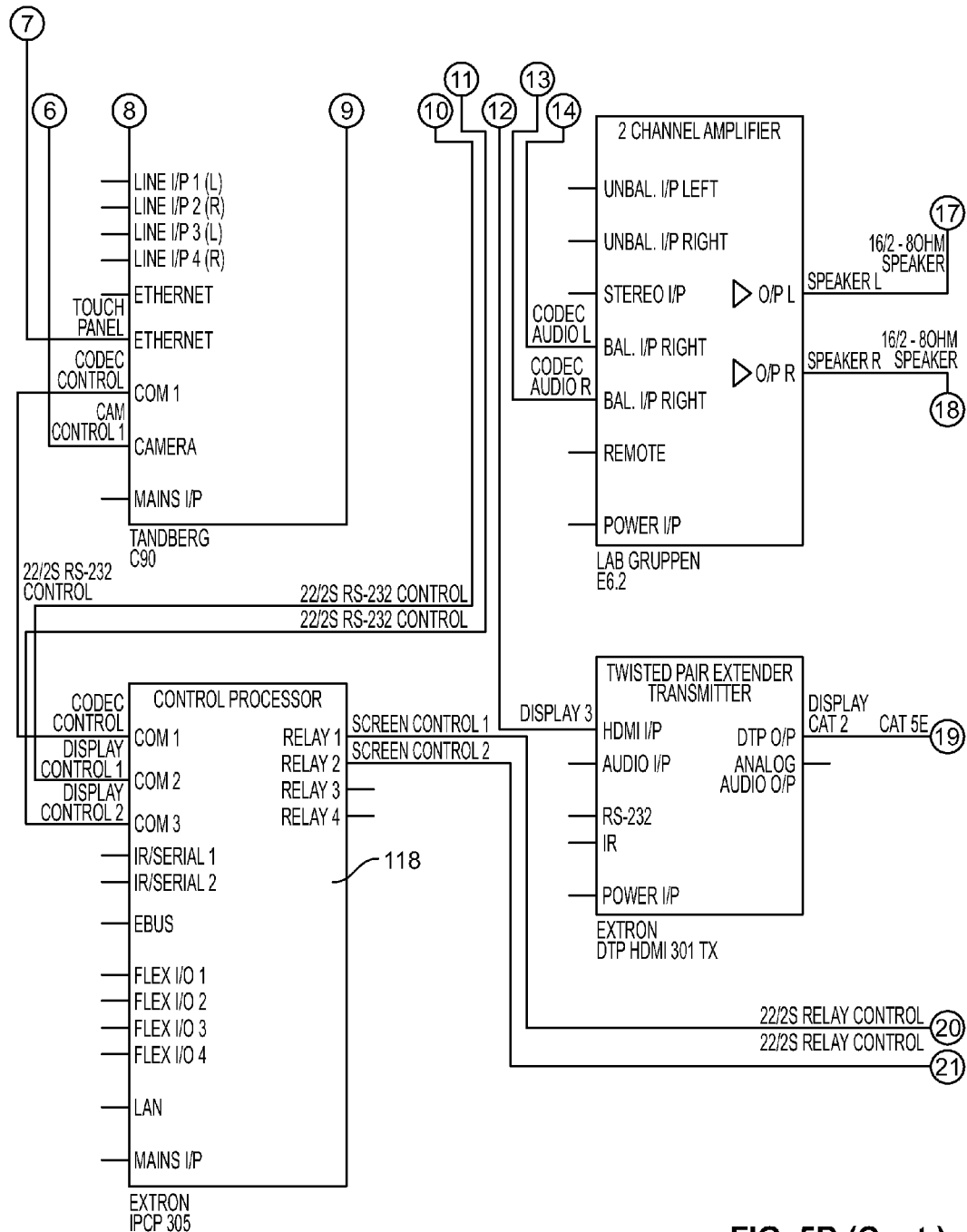
Figure 5C:
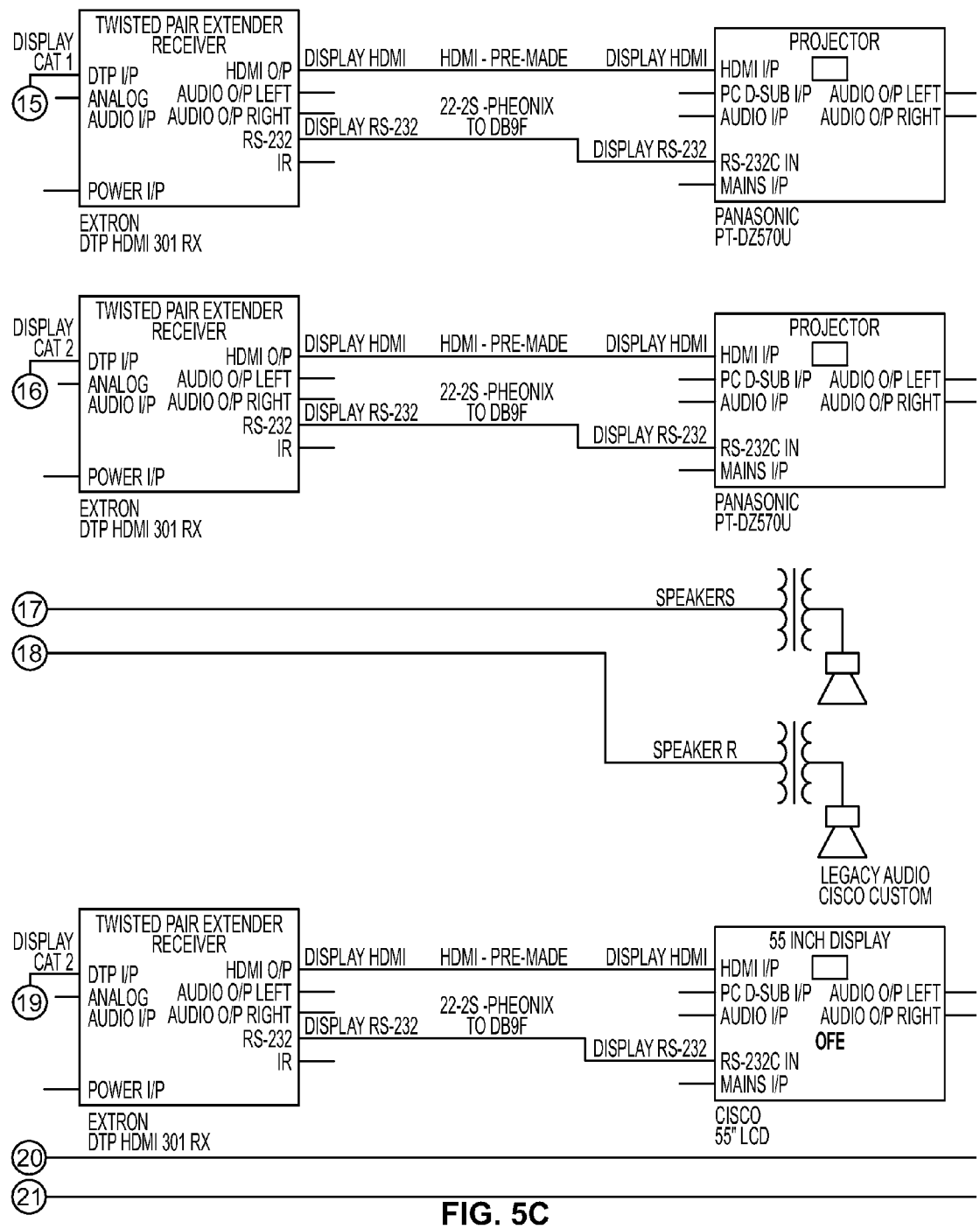
Figure 5D:
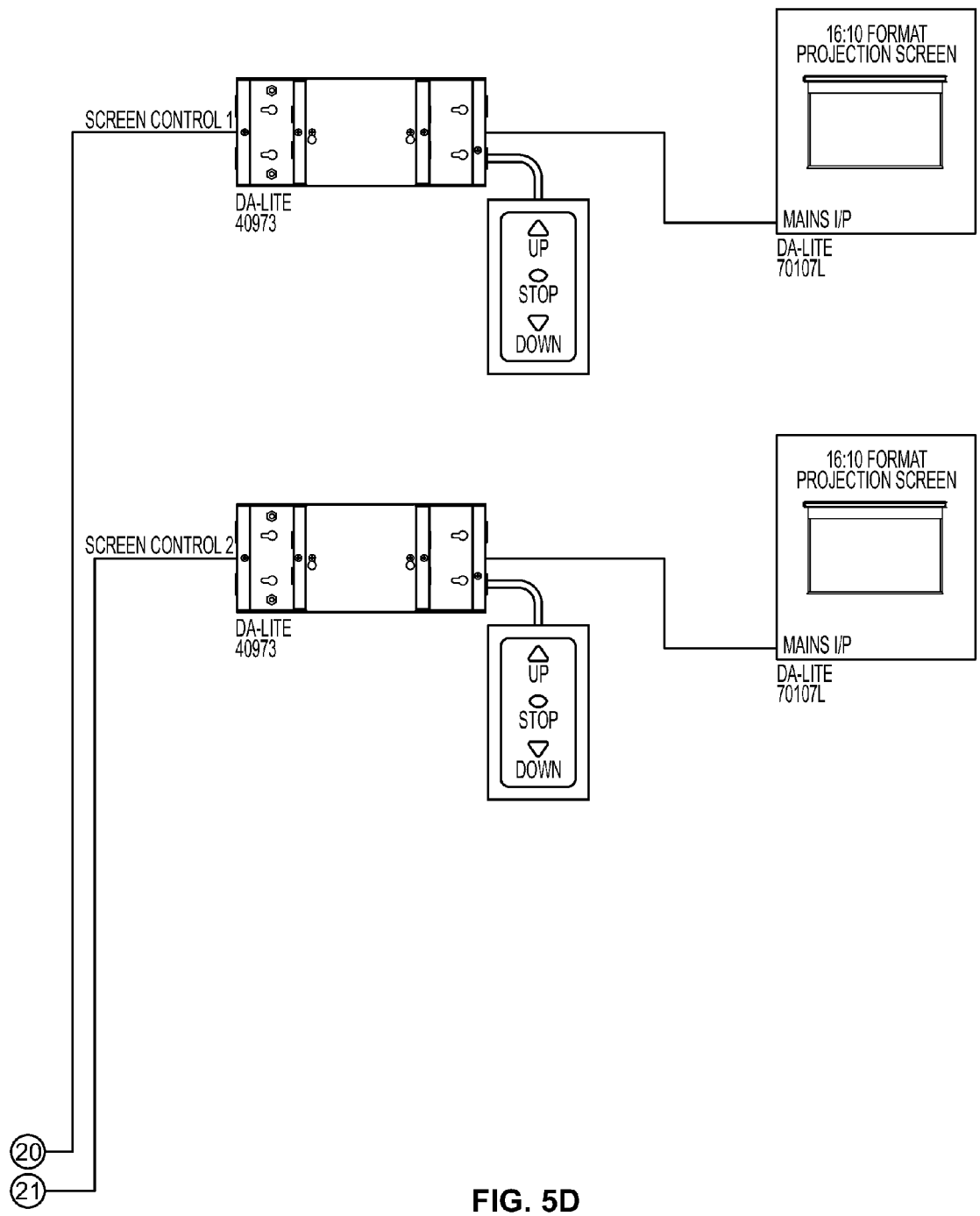

FIG. 4 illustrates a videoconferencing system 100 according to one example embodiment of the present disclosure. As shown in FIG. 4, the system 100 includes a codec 110 configured to generate one or more acknowledgement signals, a remote control 114 for controlling the codec, a system controller 118 in communication with the codec 110, and various other videoconferencing components including one or more displays 120, speaker(s) 124, camera(s) 132, microphone(s) 128, and video transmitter/receiver/scaler/switcher equipment 136.

Although multiple other videoconferencing components 120, 124, 128, 132, 136 are shown in FIG. 4, only one other videoconferencing component may be used in any given implementation of these teachings.

The codec 110 preferably issues one or more acknowledgement signals each time a predefined action or event occurs. For example, when the codec 110 is powered on, it issues an acknowledgment signal indicating it powered on. The remote control 114 for the codec 110 may "listen" to these acknowledgement signals and, in response, update what is displayed on its user interface 116. For example, upon "hearing" an acknowledgement signal indicating the codec 110 powered on, the remote control 114 may provide an indication on its interface 116 that the codec 110 is "on."

The system controller 118 is configured to send one or more commands to the one or more other videoconferencing components 120, 124, 128, 132, 136 in response to the one or more acknowledgement signals generated by the codec 110. Thus, the system controller 118 may "listen to" acknowledgement signals issued by the codec 110. In response, the system controller 118 may send appropriate command(s) (e.g., based on preprogrammed logic) to the display 120, speakers 124, microphone 128, cameras 132, video transmitter/receiver components 136, lighting and/or window treatment controls 140, 144, etc.

The remote control 114 includes a user interface 116, such as a touch screen user interface, by which a user may initiate video calls, end or "hang up" video calls, adjust the volume of the call, etc. The codec 110 may provide video switching, scaling, volume control and camera control as well as complex dialing and call management.

In some embodiments, when the system controller 118 interacts with the codec 110, the system controller 118 does not duplicate capabilities such as audio digital signal processing (DSP), user interface, video switching/scaling, etc., that are provided through the codec 110. The system controller may communicate with the codec 110, e.g., via a two-way RS-232 interface using an application programming interface (API) of the codec 110.

In response to codec acknowledgements, the system controller 118 may provide commands to other devices to perform various functions. For example, the codec 110 may be configured to automatically accept calls. Upon receiving a call, the codec 110 issues an acknowledgement signal. In response to the acknowledgement signal indicating a call was accepted, the system controller 118 may command the display 120 to power on, switch the display 120 to the appropriate video input, and adjust the speaker 124 volume, lighting 140 and window treatments 144.

Additionally, or alternatively, a user may plug his/her laptop or other device into a room connection for a laptop. The system controller 118 may sense through the codec (e.g., via an acknowledgement signal) that a device has been connected. In response, the system controller 118 may command the display 120 to power on, switch the display 120 to the appropriate video input, and adjust the speaker 124 volume in the room. When the user's device is disconnected, the system controller 118 may set a timer, e.g., for thirty minutes. After thirty minutes have passed, the system controller may command the display 120 to turn off unless, perhaps, another device has established a connection in the meantime. If another user device is connected and subsequently is disconnected, the system controller 118 again sets the timer for thirty minutes.

In some embodiments, the system controller 118 may be programmed not only to monitor the codec 110, but also to send commands to the codec 110. In one example embodiment, videoconferencing may be provided in a large room having two displays 120 at opposite ends of the room. The room may normally be divided into two smaller rooms by a movable room divider having a motion sensor or other device in communication with the system controller 118. If the system controller 118 receives a signal from, e.g., the motion sensor indicating the room divider is being retracted to enlarge the room, the system controller 118 may command both displays 120 to power on and command the codec 110 to switch the appropriate video inputs/outputs to both displays 120.

Although the system controller 118 may be configured to perform various preset functions to control a conference room environment, not all of such functions need to be performed in response to the codec 110. The system controller 118 may execute independently of the codec 110 to perform various preset functions using equipment that may or may not communicate with the codec 110 in providing other functions. For example, the system controller may provide preset functions for a local presentation that does not involve videoconferencing. The system controller 118 may communicate with a presentation switch, e.g., a matrix switcher or presentation scaler of the video transmitter/receiver/scaler equipment 136. The switch may be configured to generate an acknowledgement signal in response to a laptop or other presentation source being connected to an input of the switch. When the system controller receives an acknowledgement signal from the switch, the system controller 118 may send one or commands to other system components, e.g., to dim the lights 140 and/or shades 144. In some embodiments, the system controller 118 may monitor motion sensors, smoke sensors, etc. for particular events and may turn on lights, alarms, etc. in response to predefined events and/or environment conditions.

In some embodiments, the system controller 118 does not include a tactile user interface (i.e., having switches or buttons). Further, in some embodiments, the remote control 114 for the codec 110 is the only user interface in the system and may provide only limited functionality to the user such as initiating/terminating calls, adjusting volume, etc. All other functionality may be provided by programming logic stored in the system controller 118.

Other or additional components and functions could be provided, e.g., by a manufacturer of the videoconferencing system 100, that a user would directly control through the user interface 116, remote control 114 and codec 110. In some embodiments, the videoconferencing system 100 performs various functions that are not directly user-controlled, but instead are implemented automatically as described herein.

The codec 110 and many, if not most, of the other devices of the videoconferencing system 100 communicate in any suitable manner including, for example, using serial (e.g., RS-232) and/or Internet Protocol (IP) interfaces. In one example implementation of the system shown in FIG. 4, the codec 110 is a Cisco® C40 codec and the remote control 114 is a Cisco® CTS-CTRL-DVC8 touch panel. The video transmission, reception, scaling and/or switching may be performed with wirelessly, e.g., via a Barco ClickShare® system. Additionally, or alternatively, wired transmission and reception/scaling may be provided, e.g., via a Crestron® DM-TX-201-C video transmitter and a Crestron® DM-RMC-SCALER-C video receiver/scaler. The system controller 118 may be, e.g., a Crestron® MC3.

The foregoing system can be more standardized and user-friendly than other systems currently in use, because a user is not required to interact with more than one remote control, and that one remote (i.e., the codec remote 114) may have only limited and/or standardized functionality so as not to overwhelm the user with options, programming features, or required actions. What the videoconferencing system can and cannot do may be quickly and clearly defined. Further, the overall cost of obtaining and installing the system may be less because a custom remote is not required, and therefore does not have to be programmed. Further, the system controller 118 may be configured for use with a particular type/model of codec remote, and/or preprogrammed with logic that applies to virtually any videoconferencing setup, which can further decrease costs and/or simplify installation.

FIGS. 5A-5D illustrate a videoconferencing system 500 according to another example embodiment of the present disclosure. The system 500 includes a control device 114 that is preferably programmed to communicate (i.e., "talk") to only a single device, namely, the videoconferencing codec 110. The control device 114 may include a touch screen. The control device 114 may talk directly to (and only to) the codec 110 via wires and/or wirelessly. No feedback is provided to the control device 114 other than from the device it is connected to, e.g. the codec 110. A system controller 118 is programmed to listen for actions of the control device 114, such as acknowledgements, etc. Based on received acknowledgements and preprogrammed logic, the controller 118 sends control signals to other devices in the system 500 as necessary to carry out the tasks requested by the control device 114.

Figure 6:
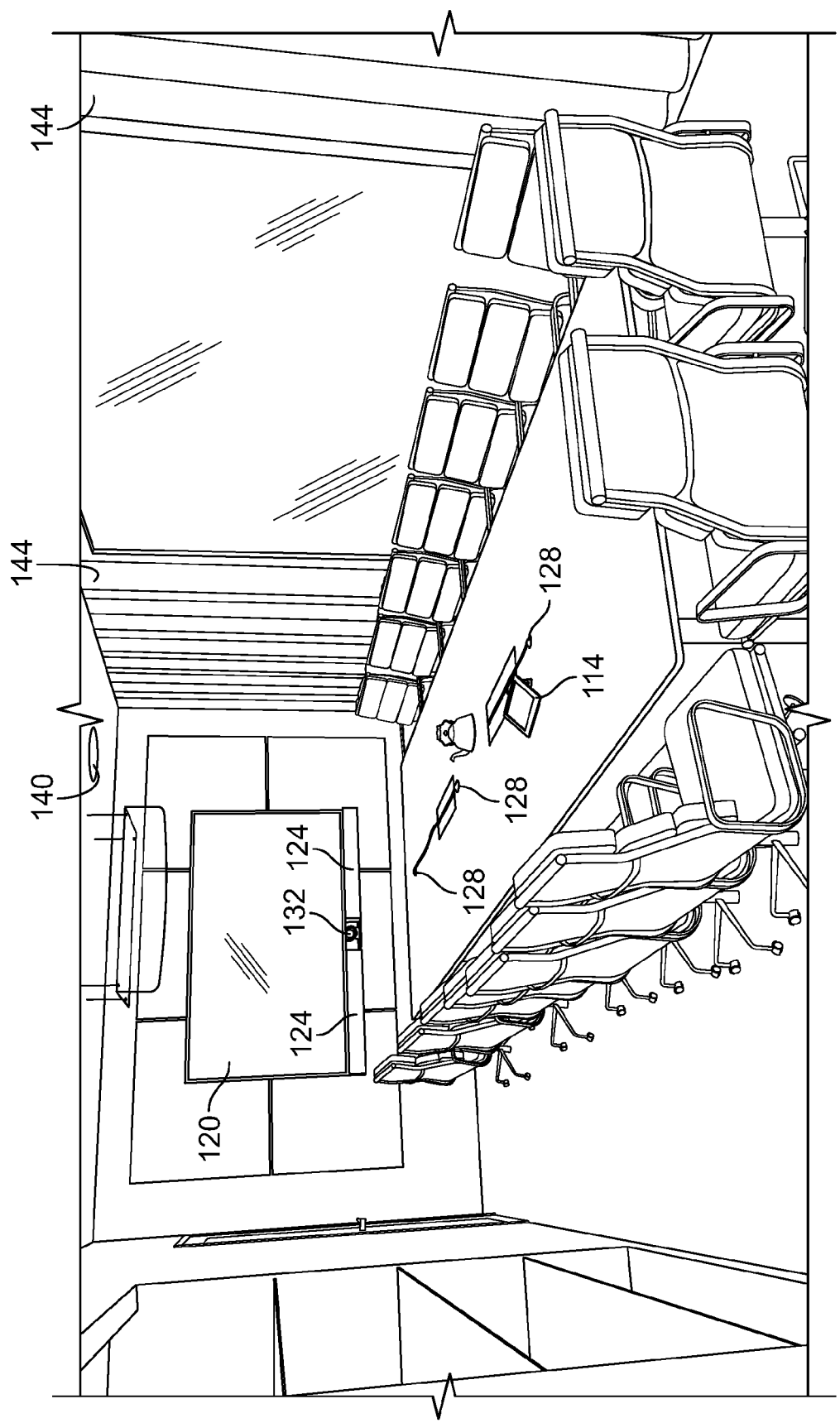
FIG. 6 illustrates an example meeting room implementation of the videoconferencing system of FIG. 4.

FIG. 6 illustrates an example implementation of the videoconferencing system of FIG. 4 in an office meeting room. The system of FIG. 6 includes a touch panel 114 for controlling a codec in communication with a system controller, and various other videoconferencing components including a display 120, speakers 124, a camera 132, microphones 128, lighting 140, and window treatments 144.

Figure 7:
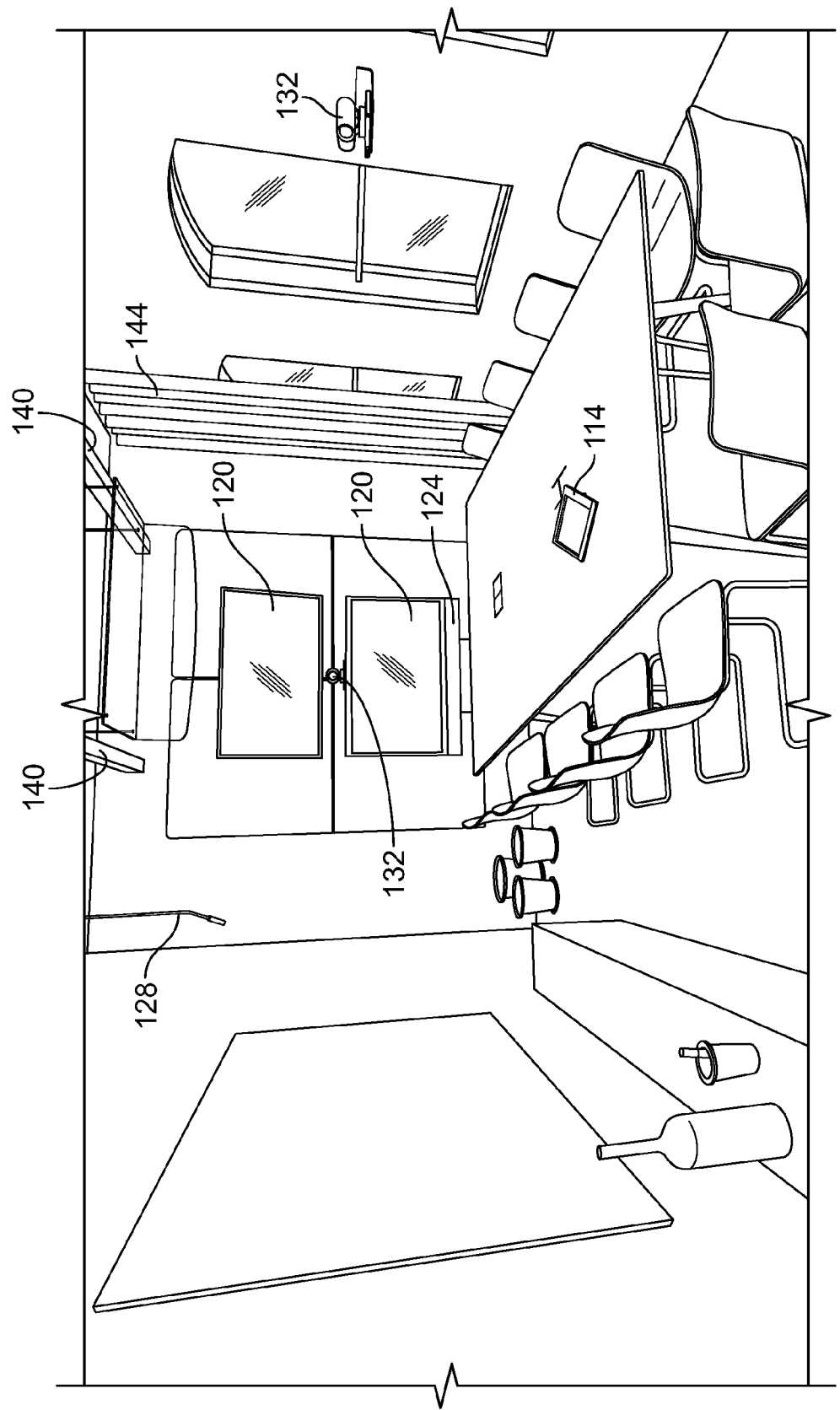
FIG. 7 illustrates an example meeting room implementation of the videoconferencing system of FIG. 4 with multiple displays.

FIG. 7 illustrates a videoconferencing system similar to the system of FIG. 6, but includes two displays 120.

In one preferred embodiment, a videoconferencing system is implemented in a meeting room having dimensions of approximately ten to fifteen feet wide by fifteen to twenty five feet deep. The touch panel 114 may control all aspects of the system including the displays 120 and the audio volume. Lighting 140 and other devices may or may not be controlled by the touch panel 114. Content input from a laptop may be provided through a wired or wireless connection.

There may be only a single display 120, or there may multiple displays positioned in any suitable configuration (e.g. two or more displays arranged side-by-side, two displays arranged one above the other, two or more displays positioned on opposite ends of the room, etc.). The one or more displays 120 may be, e.g., LED displays and may have a screen size (measured diagonally) of approximately fifty five inches to approximately ninety inches.

Room audio may be provided through one or more custom conference loudspeakers 124, through integrated system speakers, or through any other suitable speaker configuration. Room audio may be captured using table top microphones 128, ceiling mount microphones, integrated system microphones, or any other suitable configuration. Acoustic room treatments and/or video specific lighting may also be included in the system.

The touch panel 114 may be configured to "wake up" the system and turn on the display 120 when a user touches the touch panel. The touch panel 114 may be configured to provide a user with the option to place a video call, run a presentation, adjust the camera control and/or other settings, etc. The system may also be configured to automatically switch between video input sources and scale video signals as appropriate based on device connections, depending on whether the user has selected a conference call or a presentation, etc. The system may be configured to go into a standby mode after a period of inactivity, if the user selects the standby mode, etc. The system may automatically wake up and turn on when a user touches the touch panel as described above, when a call is received (e.g., if the system is set to auto-answer), etc.

Audio quality may be affected by significant outside noise coming into the room, such as road noise, HVAC noise, other environmental noise, etc. Rooms with excessive hard surfaces such as significant glass, wood and/or stone may also affect audio quality. Therefore, it may be preferable for a videoconferencing and/or presentation room to have an acoustic tile ceiling, carpeted flooring, audio treatments on drywall, etc. Rooms having insufficient light may affect video quality and cause displayed images to appear grainy or otherwise distorted. Rooms with untreated or undertreated windows can also allow sunlight into the room to compete with the room lighting and affect the video quality. It is therefore preferable for the videoconferencing and/or presentation room to have sufficient lighting 140 and, if necessary, window treatments 144.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A videoconferencing system comprising:
    a codec configured to generate one or more acknowledgement signals;
    a remote control for controlling the codec;
    a system controller in communication with the codec for receiving the one or more acknowledgement signals generated by the codec; and
    at least one other videoconferencing component;
    the system controller configured to send one or more commands to the other videoconferencing component independently of the codec in response to receiving the one or more acknowledgement signals generated by the codec.

2. The system of claim 1 wherein the codec is configured to generate one or more acknowledgement signals in response to a command from the remote control, and wherein the system controller is configured to send one or more commands to the other videoconferencing component in response to receiving the one or more acknowledgement signals generated by the codec in response to the command from the remote control.

3. The system of claim 1 wherein the system controller is not configured to generate one or more commands to the codec.

4. The system of claim 1 wherein the system controller does not include a remote control.

5. The system of claim 1 wherein the remote control is not configured for controlling the other videoconferencing component(s).

6. The system of claim 5 wherein the remote control is configured for controlling only the codec.

7. The system of claim 1 wherein the system controller does not include a tactile user interface.

8. The system of claim 1 wherein the system includes a plurality of other components.

9. The system of claim 8 wherein the controller is configured to send one or more commands to each of the other components in response to receiving the one or more acknowledgement signals generated by the codec.

10. The system of claim 9 wherein the other components are selected from the group consisting of flat panel displays, window treatment controls, lighting controls, camera controls, video transmitters, video receivers, video scalers, video switchers, room divider controls, microphone controls, alarms, and audio speaker controls.

11. The system of claim 1 wherein the system controller is configured to send one or more commands to the codec.

12. A presentation system comprising:
    a presentation switch having an input for connecting a presentation source, the presentation switch configured to generate one or more acknowledgement signals;
    a system controller in communication with the presentation switch for receiving the one or more acknowledgement signals generated by the presentation switch; and
    at least one other presentation component;
    the system controller configured to send one or more commands to the other presentation component or the presentation switch in response to receiving the one or more acknowledgement signals generated by the presentation switch.

13. The system of claim 12, wherein the presentation switch includes a video switcher.

14. The system of claim 12 wherein the system is configured to automatically perform one or more functions without user input.

15. The system of claim 12 wherein the system controller communicates with the codec via an application programming interface of the codec.

16. The system of claim 12 wherein the system controller is configured to automatically shut down one or more of the other components.

17. A videoconferencing system comprising:
    a codec configured to issue one or more acknowledgement signals;
    a remote control including a single user interface for controlling the codec;
    a system controller in communication with the codec for receiving the one or more acknowledgement signals issued by the codec; and
    at least one other videoconferencing component;
    the system controller configured to send one or more commands to the other videoconferencing component independently of the codec in response to receiving the one or more acknowledgement signals issued by the codec.

18. The system of claim 17 wherein the single user interface is not configured for controlling the other videoconferencing component.

19. The system of claim 18 wherein the single user interface is configured for controlling only the codec.

20. The system of claim 17 wherein the single user interface is configured to implement only predefined functions.

21. The system of claim 17 wherein the system controller does not include a user interface.

* * * * *